(12) United States Patent
Seo et al.

(10) Patent No.: US 11,650,362 B2
(45) Date of Patent: May 16, 2023

(54) POLARIZING PLATE, LIQUID CRYSTAL PANEL AND DISPLAY DEVICE

(71) Applicant: LG CHEM, LTD., Seoul (KR)

(72) Inventors: Jung Hyun Seo, Daejeon (KR); Jinseok Byun, Daejeon (KR); Jaehoon Shim, Daejeon (KR); Soo Kyoung Lee, Daejeon (KR); Joo Jong Moon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 17 days.

(21) Appl. No.: 16/976,242

(22) PCT Filed: Jul. 1, 2019

(86) PCT No.: PCT/KR2019/007955
§ 371 (c)(1),
(2) Date: Aug. 27, 2020

(87) PCT Pub. No.: WO2020/005041
PCT Pub. Date: Jan. 2, 2020

(65) Prior Publication Data
US 2021/0018667 A1 Jan. 21, 2021

(30) Foreign Application Priority Data

Jun. 29, 2018 (KR) .................. 10-2018-0075899
Dec. 21, 2018 (KR) .................. 10-2018-0167778
Jun. 28, 2019 (KR) .................. 10-2019-0078374

(51) Int. Cl.
*G02B 5/30* (2006.01)
*G02B 1/14* (2015.01)
(Continued)

(52) U.S. Cl.
CPC ............. *G02B 5/3041* (2013.01); *C09D 7/61* (2018.01); *C09D 7/63* (2018.01); *C09D 7/67* (2018.01);
(Continued)

(58) Field of Classification Search
CPC ......... G02F 1/133528; G02F 1/133531; G02B 5/3033; G02B 5/3041; G02B 1/14; G02B 1/11
See application file for complete search history.

(56) References Cited

U.S. PATENT DOCUMENTS 7,282,091 B2   10/2007   Hashimoto
7,622,055 B2   11/2009   Nakano et al.
(Continued)

FOREIGN PATENT DOCUMENTS

CN   101644792 A   2/2010
CN   106488839 A   3/2017
(Continued)

OTHER PUBLICATIONS

English translation for JP-2008107432-A, Kuramoto H (Year: 2018).*
(Continued)

*Primary Examiner* — Jonathan Y Jung
(74) *Attorney, Agent, or Firm* — Rothwell, Figg, Ernst & Manbeck, P.C.

(57) ABSTRACT

The present invention relates to a polarizing plate including: a polarizer; a hard coating layer having a thickness of 10 μm or less formed on one surface side of the polarizer; and an optical laminate including a light-transmitting substrate formed on the other surface side of the polarizer.

14 Claims, 3 Drawing Sheets

(51) Int. Cl.
*C09D 7/40* (2018.01)
*C09D 7/61* (2018.01)
*C09D 7/63* (2018.01)
*G02F 1/1335* (2006.01)
*C09D 135/02* (2006.01)

(52) U.S. Cl.
CPC ............... *C09D 7/68* (2018.01); *C09D 7/69* (2018.01); *C09D 135/02* (2013.01); *G02B 1/14* (2015.01); *G02F 1/133528* (2013.01); *G02B 2207/101* (2013.01); *G02F 1/133531* (2021.01)

(56) References Cited

U.S. PATENT DOCUMENTS

| | | | |
|---|---|---|---|
| 9,069,197 | B2 | 6/2015 | Kuroda et al. |
| 9,995,953 | B2 | 6/2018 | Kuroda et al. |
| 10,042,194 | B2 | 8/2018 | Kuroda et al. |
| 10,048,522 | B2 | 8/2018 | Kuroda et al. |
| 10,409,105 | B2 | 9/2019 | Kuroda et al. |
| 2007/0243364 | A1 | 10/2007 | Maekawa et al. |
| 2008/0062366 | A1 | 3/2008 | Ohtani et al. |
| 2011/0043733 | A1 | 2/2011 | Suzuki et al. |
| 2013/0098524 | A1 | 4/2013 | Suzuki et al. |
| 2013/0126085 | A1 | 5/2013 | Suzuki et al. |
| 2014/0043683 | A1 | 2/2014 | Jo et al. |
| 2014/0178706 | A1 | 6/2014 | Park et al. |
| 2015/0226884 | A1 | 8/2015 | Park et al. |
| 2016/0025909 | A1 | 1/2016 | Yeo |
| 2017/0235023 | A1 | 8/2017 | Mita et al. |
| 2017/0299779 | A1 | 10/2017 | Mita et al. |
| 2018/0200988 | A1* | 7/2018 | Kaneiwa ............... G02B 5/3033 |
| 2019/0103589 | A1* | 4/2019 | Iida ....................... G02B 5/3083 |
| 2019/0154884 | A1* | 5/2019 | Kim ....................... G02B 5/305 |
| 2019/0346606 | A1 | 11/2019 | Mashima |
| 2020/0142256 | A1 | 5/2020 | Kim et al. |
| 2020/0301055 | A1 | 9/2020 | Lee et al. |
| 2021/0165272 | A1* | 6/2021 | Liu ................... G02F 1/133512 |

FOREIGN PATENT DOCUMENTS

| | | | |
|---|---|---|---|
| CN | 107076908 | A | 8/2017 |
| EP | 1930748 | A1 | 6/2008 |
| JP | 2001-332132 | A | 11/2001 |
| JP | 2005-014584 | A | 1/2005 |
| JP | 2006-251043 | A | 9/2006 |
| JP | 2008-107432 | A | 5/2008 |
| JP | 2008107432 | A * | 5/2008 |
| JP | 2009166322 | A * | 7/2009 |
| JP | 4776754 | B2 | 9/2011 |
| JP | 2012-198534 | A | 10/2012 |
| JP | 2013-010199 | A | 1/2013 |
| JP | 5267920 | B2 | 8/2013 |
| JP | 2014-095880 | A | 5/2014 |
| JP | 2014-206702 | A | 10/2014 |
| JP | 2015-143778 | A | 8/2015 |
| JP | 2015-532459 | A | 11/2015 |
| JP | 2015-215593 | A | 12/2015 |
| JP | 2015-222368 | A | 12/2015 |
| JP | 6314228 | B2 | 4/2018 |
| KR | 10-0637632 | B1 | 10/2006 |
| KR | 10-2007-0111352 | A | 11/2007 |
| KR | 10-2010-0018462 | A | 2/2010 |
| KR | 10-2014-0069350 | A | 6/2014 |
| KR | 10-2014-0080430 | A | 6/2014 |
| KR | 10-2014-0091200 | A | 7/2014 |
| KR | 20150099470 | A * | 8/2015 |
| KR | 10-2016-0012353 | A | 2/2016 |
| KR | 10-2016-0065409 | A | 6/2016 |
| KR | 10-1730855 | B1 | 4/2017 |
| KR | 10-2017-0063673 | A | 6/2017 |
| KR | 10-1772265 | B1 | 8/2017 |
| KR | 10-2017-0121522 | A | 11/2017 |
| KR | 10-2018-0014798 | A | 2/2018 |
| KR | 10-2018-0060028 | A | 6/2018 |
| KR | 10-2019-0008154 | A | 1/2019 |
| TW | 201738591 | A | 11/2017 |
| WO | 2007-026659 | A1 | 3/2007 |
| WO | 2009-145150 | A1 | 12/2009 |
| WO | 2015-166941 | A1 | 11/2015 |
| WO | 2015-190190 | A1 | 12/2015 |
| WO | 2016-052531 | A1 | 4/2016 |
| WO | 2017-170216 | A1 | 10/2017 |
| WO | 2017-188552 | A1 | 11/2017 |

OTHER PUBLICATIONS

English translation for JP-2009166322-A, Nishikawa K (Year: 2009).*
English translation for KR-20150099470-A, Jung S (Year: 2015).*
Extended European Search Report dated Jan. 29, 2021, of the corresponding European Patent Application No. 19826950.8, 8 pages.
Extended European Search Report dated Feb. 19, 2021, of the corresponding European Patent Application No. 19826293.3, 7 pages.
International Search Report and Written Opinion issued for International Application No. PCT/KR2019/007955 dated Oct. 17, 2019, 9 pages.
International Search Report and Written Opinion issued for International Application No. PCT/KR2019/005062 dated Aug. 9, 2019, 10 pages.

* cited by examiner

[FIG. 1]
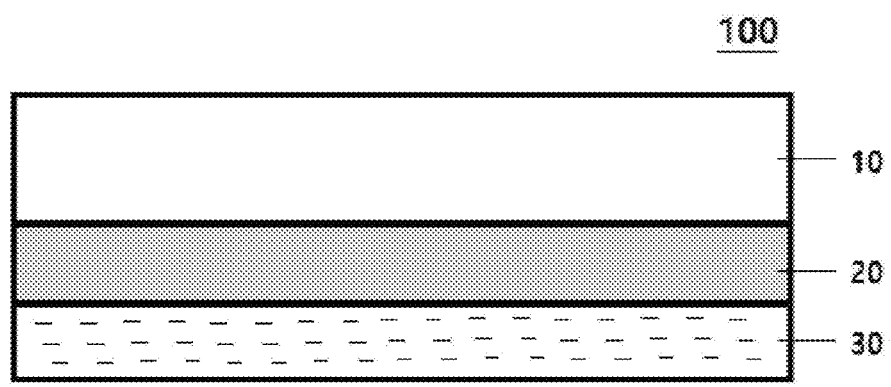
[FIG. 2]
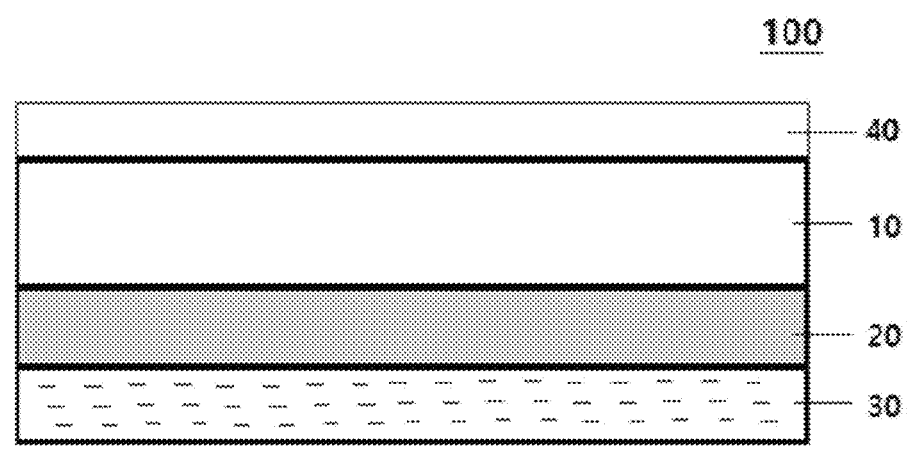

[FIG. 3]
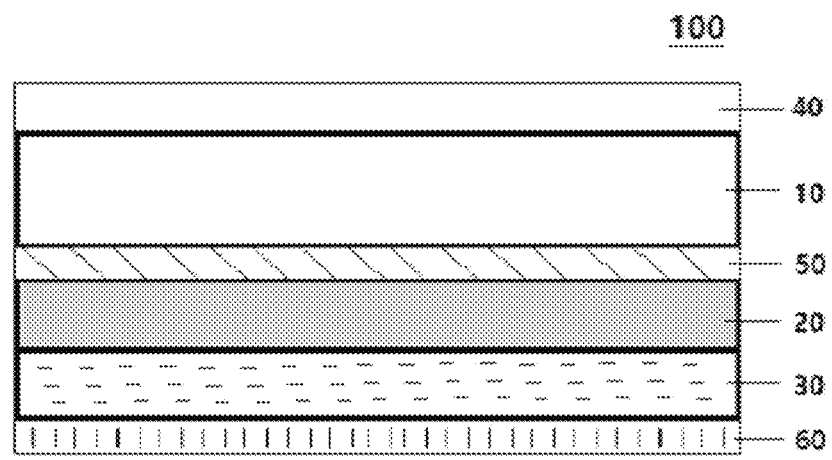
[FIG. 4]
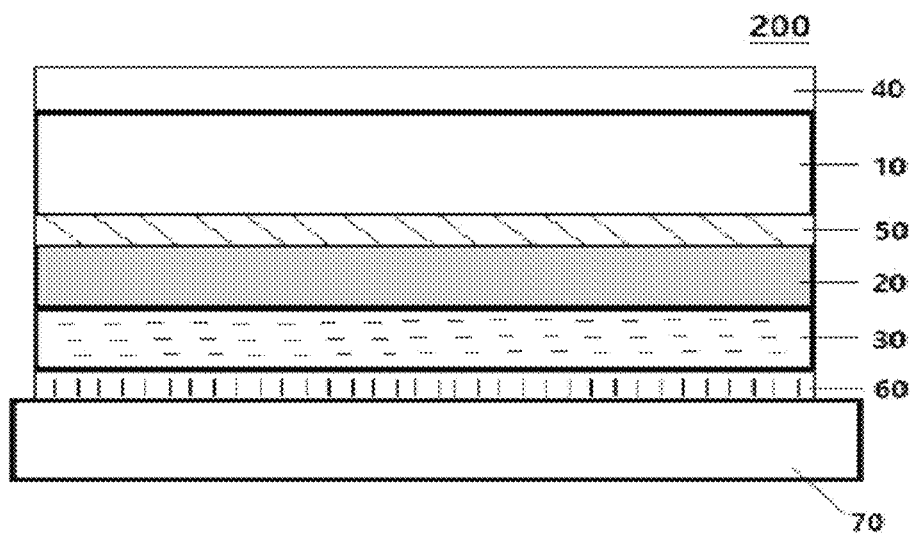

[FIG. 5]
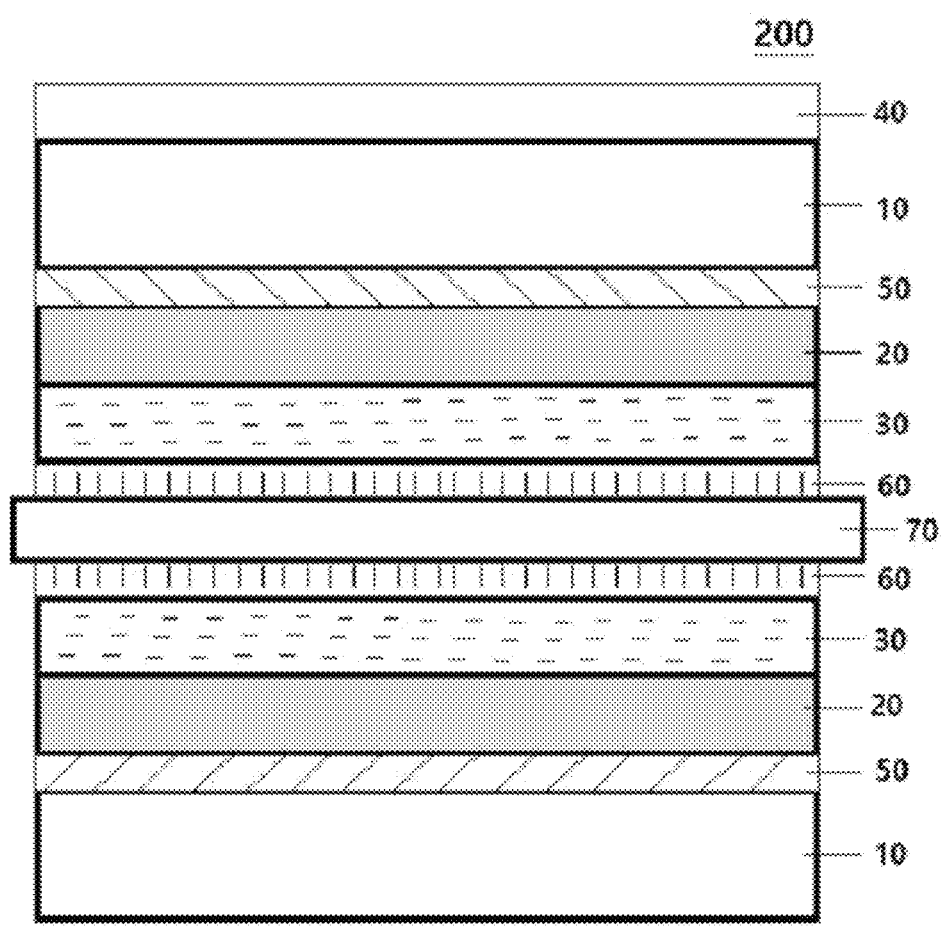

POLARIZING PLATE, LIQUID CRYSTAL PANEL AND DISPLAY DEVICE

CROSS-REFERENCE TO RELATED APPLICATION(S)

This application is a 35 U.S.C. 371 National Phase Entry Application from PCT/KR2019/007955, filed on Jul. 1, 2019, designating the United States, which claims priority to or the benefit of Korean Patent Application No. 10-2018-0075899 filed on Jun. 29, 2018, Korean Patent Application No. 10-2018-0167778 filed on Dec. 21, 2018, and Korean Patent Application No. 10-2019-0078374 filed on Jun. 28, 2019 in the Korean Intellectual Property Office, the disclosures of which are incorporated herein by reference in their entirety.

The present invention relates to a polarizing plate, a liquid crystal panel, and a display device.

BACKGROUND OF THE INVENTION

A liquid crystal display device is a display visualizing polarization by a switching effect of a liquid crystal and has been used in various categories ranging from small and medium displays, such as a computer, a laptop, an electronic watch, and a mobile terminal device, to a large-scale TV.

Currently, as a considerable number of polarizing plates mass-produced and commercialized for display devices, those obtained by joining a protective film which is optically transparent and has a mechanical strength onto both surfaces or one surface of a polarizing film (polarizer) formed by coloring a dichromatic material such as iodine or a dichroic dye on a polyvinyl alcohol-based film, cross-linking with a boron compound, followed by stretching and aligning, have been used.

However, the stretched polyvinyl alcohol-based film has a problem in that shrinkage deformation easily occurs under a durability condition such as high temperature and high humidity. When the polarizer is deformed, the problems occur in that stress thereof affects the protective film and the liquid crystal and causes bending, and as a result, it leads to problems such as a change in physical properties of the polarizing plate including the polarizer and an occurrence of a light leakage phenomenon in a liquid crystal display device.

BRIEF SUMMARY OF THE INVENTION

The present invention provides a polarizing plate which can control a heat shrinkage rate of detail layers and the like, realize a stable internal structure while having a good bending balance and thus prevent cracks, and further, prevent a light leakage phenomenon in a liquid crystal display device.

The present invention also provides a liquid crystal panel and a display device including the above-mentioned polarizing plate.

In one aspect of the present invention, there is provided a polarizing plate including: a polarizer; a hard coating layer having a thickness of 10 um or less formed on one surface side of the polarizer; and an optical laminate including a light-transmitting substrate formed on the other surface side of the polarizer.

In another aspect of the present invention, there is provided a polarizing plate including: a polarizer; a hard coating layer having a thickness of 10 μm or less formed on one surface side of the polarizer; and an optical laminate including a light-transmitting substrate formed on the other surface side of the polarizer, wherein a ratio of a heat shrinkage deformation value in the second direction of the optical to a heat shrinkage deformation value in the first direction of the optical laminate perpendicular to the second direction is in a specific range.

In another aspect of the present invention, there is provided a polarizing plate including: a polarizer; a hard coating layer having a thickness of 10 μm or less formed on one surface side of the polarizer; and an optical laminate including a light-transmitting substrate formed on the other surface side of the polarizer, wherein a ratio of a heat shrinkage deformation value in the second direction of the optical laminate to a heat shrinkage deformation value in the first direction of the optical laminate perpendicular to the second direction is 0.8 to 1.2.

In yet another aspect of the present invention, there is provided a liquid crystal panel wherein the polarizing plate is formed on at least one surface of the liquid crystal cell.

In the other aspect of the present invention, there is provided a display device including the above-mentioned polarizing plate.

DETAILED DESCRIPTION OF THE INVENTION

Hereinafter, the polarizing plate, the liquid crystal panel and the display device according to specific embodiments of the present invention will be described in more detail.

As used herein, terms such as first, second, and the like may be used to describe various components, and the terms are used only to discriminate one component from another component.

Also, the (meth)acryl is meant to include both acryl and methacryl.

Further, inorganic nanoparticles having a hollow structure refer to particles in a form in which an empty space exists on the surface of and/or inside the inorganic nanoparticles.

Further, the (co)polymer is meant to include both a co-polymer and a homopolymer.

According to one embodiment of the present invention, there can be provided a polarizing plate including: a polarizer; a hard coating layer having a thickness of 10 um or less formed on one surface side of the polarizer; and an optical laminate including a light-transmitting substrate formed on the other surface side of the polarizer, wherein a ratio of a heat shrinkage deformation value in the second direction of the optical laminate perpendicular to the first direction to a heat shrinkage deformation value in the first direction of the optical laminate is 0.8 to 1.2.

Triacetyl cellulose (TAC) film, which is frequently used as a polarizer protective film of a polarizing plate, is weak in water resistance and thus can be warped in a high temperature/high humidity environment, and causes defects such as light leakage, whereas the present inventors have found through experiments that as the polarizing plate of the embodiment uses a light-transmitting substrate having the above-mentioned characteristics, it is possible to secure durability without significant change in physical properties or to form even if exposed for a long time during high temperature and high humidity conditions, thereby completing the present invention.

As the polarizing plate of the embodiment satisfies the condition in which the ratio (R) of a heat shrinkage deformation value in the second direction of the optical laminate perpendicular to the first direction to a heat shrinkage deformation value in the first direction of the optical laminate is 0.8 to 1.2, or 0.85 to 1.1, and thereby, it was confirmed that the polarizing plate can control a heat shrinkage rate or a heat shrinkage deformation rate between detail layers and the like even when a temperature of 60° C. or higher is applied during the manufacturing process and has a good bending balance and further that it can prevent cracks in the polarizing plate and prevent an occurrence of a light leakage phenomenon in the liquid crystal display.

The ratio (R) may be defined by the following general formula 1.

> The ratio (R) of a heat shrinkage deformation value in the second direction of the optical laminate perpendicular to the first direction to a heat shrinkage deformation value in the first direction of the optical laminate=Heat shrinkage deformation value in the second direction of the optical laminate/heat shrinkage deformation value in the first direction of the optical laminate [General Formula 1]

Each of the heat shrinkage deformation value in the first direction of the optical laminate and the heat shrinkage deformation value in the second direction of the optical laminate may be a difference between an initial length of each of the first direction and the second direction of the optical laminate and a length value measured after exposure at a temperature of 80° C. to 120° C. for 80 to 120 hours. More specifically, it may be a difference between an initial length of the first direction and the second direction of the optical laminate and a length measured after exposure at a temperature of 100° C. for 96 hours.

Each of the heat shrinkage deformation value in the first direction of the optical laminate and the heat shrinkage deformation value in the second direction of the optical laminate may be defined by the following General Formulas 2 and 3.

> The heat shrinkage deformation value in the first direction of the optical laminate=The initial length of the first direction of the optical laminate (MD direction of PET)−The length of the first direction of the optical laminate (MD direction of PET) measured after exposure at a temperature of 80° C. to 120° C. for 80 to 120 hours [General Formula 2]

> The heat shrinkage deformation value in the second direction of the optical laminate=The initial length of the second direction of the optical laminate (TD direction of PET)−The length of the second direction of the optical laminate (MD direction of PET) measured after exposure at a temperature of 80° C. to 120° C. for 80 to 120 hours [General Formula 3]

The optical laminate may have the largest deformation in a temperature range of about 80° C., especially in a temperature range of 80° C. to 120° C. As the optical laminate is provided with a light-transmitting substrate on one surface of the polarizer and a hard coating layer having a thickness of 10 um or less on the other surface of the polarizer, it can satisfy the condition in which a ratio of a heat shrinkage deformation value in the second direction of the optical laminate perpendicular to the first direction to a heat shrinkage deformation value in the first direction of the optical laminate is 0.8 to 1.2, or 0.85 to 1.1 m.

In particular, when the light-transmitting substrate included in the optical laminate is a polymer film, for example, when it is TAC, PET, acrylic resin, cycloolefin polymer (COP), polycarbonate, polymethyl methacrylate (PMMA), and the like, the change due to temperature rise and the value of heat shrinkage deformation in the temperature section around 80° C. may be displayed larger than in the previous temperature section, wherein since the polarizing plate can have a ratio of a heat shrinkage deformation value in the second direction of the optical laminate perpendicular to the first direction to a heat shrinkage deformation value in the first direction of the optical laminate measured after exposure at a temperature of 80° C. to 120° C. for 80 to 120 hours of 0.8 to 1.2, superior durability against heat deformation or heat shrinkage can be realized, and the structural stability that is difficult to achieve with the polarizing plate of another structure previously provided can be ensured.

Further, since the polarizing plate of the embodiment includes the optical laminate and simultaneously includes a hard coating layer having a thickness of 10 um or less formed on one surface side of the polarizer, the heat shrinkage rate and heat shrinkage force between the layers can be appropriately adjusted while realizing a thinner thickness, and a rigid internal structure can be realized.

In particular, previously known polarizing plates have a structure in which a triacetyl cellulose (TAC) film or the like is positioned on both sides around the polarizer, whereas the polarizing plate of the embodiment has a structure in which an optical laminate having the above-described characteristics is positioned on one side, and a hard coating layer having a thickness of 10 um or less is positioned on the other side, and therefore, water transfer toward the PVA film can be blocked, and the overall thickness of the polarizing film can be lowered.

In this case, the first direction of the optical laminate is an MD direction (machine direction) of the light-transmitting substrate, and the second direction of the optical laminate may be a TD direction (transverse direction) of the light-transmitting substrate.

When the ratio of a heat shrinkage deformation value in the second direction of the optical laminate perpendicular to the first direction to a heat shrinkage deformation value in the first direction of the optical laminate is too small or too large, the stress transmission under high temperature and high humidity occurs unevenly, and an adhesive force between detail layers decreases, detachment occurs between the polarizer and the optical laminate, or cracks occur in the polarizer, and a light leakage phenomenon of the liquid crystal display device appears, which may be technically disadvantageous.

The light-transmitting substrate may have a transmittance of 50% or more at a wavelength of 300 nm or more.

Meanwhile, an example of the polarizing plate 100 of the embodiment is shown in FIG. 1. The polarizing plate 100 shown in FIG. 1 includes a polarizer 20 and a hard coating layer 30 having a thickness of 10 um or less and a light-transmitting substrate 10 which are positioned so as to face each other around the polarizer.

Meanwhile, the light-transmitting substrate may have a thickness direction retardation (Rth) of 3,000 nm or more as measured at a wavelength of 400 nm to 800 nm.

By controlling the retardation of the light-transmitting substrate to 3,000 nm or more, 4,000 to 15,000 nm, or 5,000 to 10,000 nm, the rainbow phenomenon due to a destructive interference is suppressed, and the visibility of an image display device can be improved similar to the cellulose ester-based film.

The retardation can be calculated by substituting into the following Equation 1 a refractive index in the slow axis direction ($n_x$) which is the direction with the highest refractive index in the plane of the light-transmitting substrate, a refractive index in the fast axis direction ($n_y$) which is a direction orthogonal to the slow axis direction, and a thickness d (unit: nm) of the light-transmitting substrate.

$$Re=(n_x-n_y)*d \quad \text{[Equation 1]}$$

In addition, such retardation may be, for example, a value measured with the use of an automatic double refraction meter (KOBRA-WR, measurement angle: 0°, measurement wavelength: 548.2 nm). Alternatively, the retardation can also be measured by the following method. First, the alignment axis direction of the light-transmitting substrate is determined using two polarizing plates, and refractive indices nx and ny of two axes orthogonal to the alignment direction are determined by an Abbe refractometer NAR-4T. In this case, an axis showing a larger refractive index is defined as a slow axis. In addition, the thickness of the light-transmitting substrate is measured using, for example, an electric micrometer, and the refractive index difference $n_x-n_y$ (hereinafter, $n_x-n_y$ is referred to as $\Delta n$) is calculated using the refractive index obtained above. The retardation can also be calculated from the product of the refractive index difference $\Delta n$ and the thickness d(nm) of a light-transmitting substrate.

Since the retardation of the light-transmitting substrate is 3000 nm or more, the refractive index difference $\Delta n$ may be 0.05 or more, 0.05 to 0.20, or 0.08 to 0.13. When the refractive index difference $\Delta n$ is less than 0.05, the thickness of the light-transmitting substrate necessary for obtaining the retardation value described above may be increased. Meanwhile, when the refractive index difference $\Delta n$ exceeds 0.20, the necessity of excessively increasing the stretch ratio occurs and thus, the light-transmitting substrate is likely to be torn and broken, and the practicality as an industrial material may be remarkably lowered, and the resistance to moisture and heat may be lowered.

The refractive index $(n_x)$ in the slow axis direction of the light-transmitting substrate may be 1.60 to 1.80 or 1.65 to 1.75. Meanwhile, the refractive index $(n_y)$ in the fast axis direction of the light-transmitting substrate having the above-mentioned in-plane birefringence may be 1.50 to 1.70, or 1.55 to 1.65.

Meanwhile, as the light-transmitting substrate, a polyethylene terephthalate (PET) film having excellent water resistance, having almost no possibility of inducing a light leakage phenomenon and having excellent mechanical properties can be used.

Meanwhile, the light-transmitting substrate may have low moisture permeation characteristics while having the thickness direction retardation (Rth) measured at a wavelength 400 nm to 800 nm of 3,000 nm or more. More specifically, the light-transmitting substrate may have a moisture permeation amount of 100 g/m² or less, or 10 to 100 g/m² when the moisture permeation amount is measured for 24 hours under the conditions of 40° C. and 100% humidity.

Meanwhile, the thickness of the light-transmitting substrate is not particularly limited, but may be 10 to 150 μm, 20 to 120 μm, or 30 to 100 μm. When the thickness of the light-transmitting substrate is less than 10 μm, it is excessively thinner than the thickness of the hard coating layer and so a bending occurs, the flexibility of the light-transmitting substrate decreases and it may be difficult to control the process. In addition, when the light-transmitting substrate is excessively thick, the transmittance of the light-transmitting substrate is decreased, the optical properties may be reduced, and it is difficult to reduce the thickness of the image display device including the same.

In order to prevent the phenomenon in which the internal structure of the polarizing plate is more robust and a bending occurs even when exposed to high-temperature conditions, the ratio of the thickness of the first hard coating layer to the thickness of the light-transmitting substrate may be 0.02 to 0.25.

As described above, if the thickness of the light-transmitting substrate does not have an appropriate range compared to the thickness of the first hard coating layer, the polarizing plate can be bent, the flexibility of the light-transmitting substrate is reduced and it may be difficult to control the process.

Meanwhile, the polarizing plate of the embodiment can realize a more robust structure even by a thinner thickness compared to other polarizer structures previously known in the art, and it may have a characteristic that the durability or physical properties do not significantly change due to external heat.

More specifically, the thickness of the polarizer plus the first hard coating layer plus the light-transmitting substrate may be 200 μm or less. For example, the polarizer may have a thickness of 40 μm or less, or 1 to 40 μm, the hard coating layer may have a thickness of 10 μm or less, or 1 to 10 μm, and the light-transmitting substrate may have a thickness of 150 μm or less.

Meanwhile, a specific composition of the hard coating layer is not particularly limited, but for example, the hard coating layer may include a binder resin; and organic fine particles having a particle size of 0.5 μm to 10 μm, or inorganic fine particles having a particle size of 1 nm to 500 nm dispersed in the binder resin.

The binder resin contained in the hard coating layer may include a photocurable resin. The photocurable resin refers to a polymer of a photopolymerizable compound which can cause a polymerization reaction when irradiated with light such as ultraviolet light.

Examples of the photocurable resin may include: a polymer or a copolymer formed from the group consisting of a reactive acrylate oligomer group including a urethane acrylate oligomer, an epoxide acrylate oligomer, a polyester acrylate, and a polyether acrylate; and a polyfunctional acrylate monomer group including dipentaerythritol hexaacrylate, dipentaerythritol pentaacrylate, pentaerythritol tetraacrylate, pentaerythritol triacrylate, trimethylolpropane triacrylate, glycerol propoxylate triacrylate, trimethylolpropane ethoxylate triacrylate, trimethylpropyl triacrylate, 1,6-hexanediol diacrylate, tripropylene glycol diacrylate, and ethylene glycol diacrylate, or an epoxy resin containing an epoxy group including an epoxy group, an alicyclic epoxy group, a glycidyl group epoxy group, or an oxetane group, etc.

The binder resin may further include a (co)polymer (hereinafter referred to as a high molecular weight (co)polymer) having a weight average molecular weight of 10,000 g/mol or more together with the above-described photocurable resin. The high molecular weight (co)polymer may include, for example, one or more polymers selected from the group consisting of cellulose-based polymers, acrylic-based polymers, styrene-based polymers, epoxide-based polymers, nylon-based polymers, urethane-based polymers and polyolefin-based polymers.

The organic or inorganic fine particles are not particularly limited in terms of particle sizes, but for example, the organic fine particles may have a particle size of 1 to 10 μm, and the inorganic particles may have a particle size of 1 nm to 500 nm, or 1 nm to 300 nm.

In addition, specific examples of the organic or inorganic fine particles included in the hard coating layer are not limited, but for example, the organic or inorganic fine particles may be organic fine particles including acrylic-based resin, styrene-based resin, epoxide resin and nylon resin or inorganic fine particles including silicon oxide, titanium dioxide, indium oxide, tin oxide, zirconium oxide and zinc oxide.

The polarizing plate of the embodiment includes a polarizer.

As the polarizer, a polarizer well-known in the art, for example, a film composed of polyvinyl alcohol (PVA) containing iodine or dichroic dye can be used. At this time, the polarizer may be produced by dyeing iodine or a dichroic dye on a polyvinyl alcohol film and stretching it, but the production method thereof is not particularly limited.

Meanwhile, when the polarizer is a polyvinyl alcohol film, the polyvinyl alcohol film may be used without particular limitation as long as it includes a polyvinyl alcohol resin or a derivative thereof. At this time, examples of the derivative of the polyvinyl alcohol resin include, but not limited to, polyvinyl formal resin, polyvinyl acetal resin, and the like. Alternatively, the polyvinyl alcohol film may be a commercially available polyvinyl alcohol film generally used in the manufacture of polarizers in the art, and examples thereof include P30, PE30 or PE60 (available from Kuraray Co., Ltd.), and M3000 or M6000 (available from Nippon Synthetic Chemical Industry Co., Ltd.).

Meanwhile, the polyvinyl alcohol film may have a degree of polymerization of 1000 to 10000 or 1500 to 5000, but is not limited thereto. When the degree of polymerization satisfies the above range, molecules may freely move and may be smoothly mixed with iodine or a dichroic dye, etc. In addition, the polarizer may have a thickness of 40 μm or less, 30 μm or less, 20 μm or less, 1 to 20 μm, or 1 to 10 μm. In this case, a device such as a polarizing plate or an image display device including the polarizer can be made thinner and lighter.

Meanwhile, the optical laminate may further include a second hard coating layer having a thickness of 1 to 100 μm formed on one surface side of the light-transmitting substrate so as to oppose to the polarizer.

As the second hard coating layer is formed, the optical laminate may implement a predetermined optical characteristic or functionality on one surface of the polarizing layer. For example, the second hard coating layer may serve as an anti-glare layer, a high refractive index layer, a medium refractive index layer, or a conventional hard coating layer.

Specific examples of the second hard coating layer is not limited, but the second hard coating layer may include a binder resin; and organic fine particles having a particle size of 0.5 μm to 10 μm, or inorganic fine particles having a particle size of 1 nm to 500 nm dispersed in the binder resin, similar to "the hard coating layer having a thickness of 10 um or less formed on surface side of the polarized".

Further, the optical laminate may further include a low-refractive index layer having a refractive index of 1.20 to 1.60 in the wavelength range of 380 nm to 780 nm formed on the other surface of the second hard coating layer.

The polarizing plate may further include an antireflection film formed on one surface side of the light-transmitting substrate to oppose to the polarizer.

Another example of the polarizing plate 100 of the embodiment is shown in FIG. 2. The polarizing plate 100 shown in FIG. 2 includes a polarizer 20 and a hard coating layer 30 having a thickness of 10 um or less and a light-transmitting substrate 10 which are positioned so as to face each other around the polarizer, wherein the polarizing plate includes an anti-reflection film 40 formed on one surface side of the light-transmitting substrate 10.

The anti-reflection film may have an average reflectance of 2% or less in a wavelength region of 380 nm to 780 nm.

The anti-reflection film may further include a hard coating layer having a thickness of 1 to 100 μm and a low-refractive index layer having a refractive index of 1.20 to 1.60 in a wavelength region of 380 nm to 780 nm.

Specific examples of the hard coating layer included in the anti-reflection film is not limited, but the hard coating layer included in the anti-reflection film may also include a binder resin; and organic fine particles having a particle size of 0.5 μm to 10 μm, or inorganic fine particles having a particle size of 1 nm to 500 nm dispersed in the binder resin, similar to "the hard coating layer having a thickness of 10 um or less positioned so as to face around the polarizer".

The details of the binder resin and the organic fine particles having a particle size of 0.5 μm to 10 μm or the inorganic fine particles having a particle size of 1 nm to 500 nm contained in the second hard coating layer included in the anti-reflection film include the contents described above.

The low-refractive index layer having a refractive index of 1.20 to 1.60 in the wavelength region of 380 nm to 780 nm may include a binder resin and organic fine particles or inorganic fine particles dispersed in the binder resin, and optionally, it may further include a fluorine-containing compound having a photoreactive functional group and/or a silicon-based compound having a photoreactive functional group.

The binder resin includes a (co)polymer containing a polyfunctional (meth)acrylate-based repeating unit, wherein the repeating unit may be derived from polyfunctional (meth)acrylate-based compounds, such as trimethylolpropane triacrylate (TMPTA), trimethylolpropane ethoxy triacrylate (TMPEOTA), glycerin propoxylate triacrylate (GPTA), pentaerythritol tetraacrylate (PETA), or pentaerythritol hexaacrylate (DPHA).

The photoreactive functional group contained in the fluorine-containing compound or silicon-based compound may be at least one functional group selected from the group consisting of a (meth)acrylate group, an epoxide group, a vinyl group, and a thiol group.

The fluorine-containing compound containing a photoreactive functional group may be at least one compound selected from the group consisting of i) an aliphatic compound or an aliphatic cyclic compound in which at least one photoreactive functional group is substituted and at least one fluorine is substituted on at least one carbon; ii) a heteroaliphatic compound or a heteroaliphatic cyclic compound in which at least one photoreactive functional group is substituted, at least one hydrogen is substituted with fluorine, and at least one carbon is substituted with silicon; iii) a polydialkylsiloxane-based polymer in which at least one photoreactive functional group is substituted and at least one fluorine is substituted on at least one silicon; and iv) a polyether compound in which at least one photoreactive functional group is substituted and at least one hydrogen is substituted with fluorine.

The low-refractive index layer may also include hollow inorganic nanoparticles, solid inorganic nanoparticles, and/or porous inorganic nanoparticles.

The hollow inorganic nanoparticles refer to particles having a maximum diameter of less than 200 nm, and a shape in which empty space is present on the surface and/or inside thereof. The hollow inorganic nanoparticles may include at least one selected from the group consisting of inorganic fine particles having a number average particle size of 1 to 200 nm, or 10 to 100 nm. In addition, the hollow inorganic nanoparticles may have a density of 1.50 g/cm$^3$ to 3.50 g/cm$^3$.

The hollow inorganic nanoparticles may contain at least one reactive functional group selected from the group consisting of a (meth)acrylate group, an epoxide group, a vinyl group, and a thiol group on a surface thereof. As the above-mentioned reactive functional group contains on the surface of the hollow inorganic nanoparticles, it is possible to have a higher degree of crosslinking.

The solid inorganic nanoparticles may include at least one selected from the group consisting of solid inorganic fine particles having a number average particle size of 0.5 to 100 nm.

The porous inorganic nanoparticles may include at least one selected from the group consisting of inorganic fine particles having a number average particle size of 0.5 to 100 nm.

The low-refractive index layer may include 10 to 400 parts by weight of the inorganic nanoparticles; and 20 to 300 parts by weight of a fluorine-containing compound and/or a silicon-based compound including the photoreactive functional group, based on 100 parts by weight of the (co) polymer.

The polarizing plate may further include an adhesive layer disposed between the polarizer and the light-transmitting substrate and having a thickness of 0.1 μm to 5 μm.

In the adhesive layer, various adhesives for polarizing plates used in the art, for example, polyvinyl alcohol-based adhesives, polyurethane-based adhesives, acrylic-based adhesives, cationic or radical-based adhesives may be used as the adhesive without limitation.

Meanwhile, the polarizing plate may further include a cohesive layer formed on the other surface of the hard coating layer coming into contact with the polarizer.

The cohesive layer may enable attachment of the polarizing plate of the embodiment and the image panel of the image display device. The cohesive layer may be formed using various adhesives well known in the art, and the kind thereof is not particularly limited. For example, the cohesive layer may be formed using a rubber-based adhesive, an acrylic-based adhesive, a silicone-based adhesive, a urethane-based adhesive, a polyvinyl alcohol-based adhesive, a polyvinylpyrrolidone-based adhesive, a polyacrylamide-based adhesive, a cellulose-based adhesive, a vinyl alkyl ether-based adhesive or the like.

Another example of the polarizing plate 100 of the embodiment is shown in FIG. 3. The polarizing plate 100 shown in FIG. 3 includes a polarizer 20 and a hard coating layer 30 having a thickness of 10 um or less and a light-transmitting substrate 10 which are positioned so as to face each other around the polarizer, wherein the polarizing plate includes an anti-reflection film 40 formed on one surface side of the light-transmitting substrate 10, and also includes an adhesive layer 50 positioned between the polarizer and the light-transmitting substrate and a cohesive layer 60 formed on the other surface of the hard coating film coming into contact with the polarizer.

The thickness of the cohesive layer is also not particularly limited, and for example, the cohesive layer may have a thickness of 1 to 50 um.

According to another embodiment of the present invention, a liquid crystal panel in which a polarizing plate is formed on at least one surface of a liquid crystal cell can be provided.

An example of the liquid crystal panel 200 of the embodiment is shown in FIG. 4. The liquid crystal panel 200 shown in FIG. 4 has a structure in which the polarizing plate 100 is formed on one surface side of the liquid crystal panel.

In addition, still another example of the liquid crystal panel 200 of the embodiment is shown in FIG. 5. The liquid crystal panel 200 shown in FIG. 5 has a structure in which the polarizing plate 100 is formed on both surfaces of the liquid crystal panel.

In the liquid crystal panel, the polarizing plates may be respectively formed on both surfaces of the liquid crystal cell, wherein the two polarizing plates may be positioned such that the MD direction of the polarizer of the polarizing plate formed on one surface side of the liquid crystal cell and the MD direction of the polarizer of the polarizing plate formed on the other surface are perpendicular to each other.

According to still another embodiment of the present invention, a display device including the polarizing plate described above can be provided.

Specific examples of the display device are not limited, and for example, it may be a device such as a liquid crystal display, a plasma display, or an organic light emitting diode.

As one example, the display device may be a liquid crystal display device including a pair of polarizing plates opposing to each other; a thin film transistor, a color filter, and a liquid crystal cell which are sequentially stacked between the pair of polarizing plates; and a backlight unit.

In the display device, the anti-reflection film may be provided on the outermost surface of a display panel at an observer side or a backlight side.

In the display device including the anti-reflection film, the anti-reflection film may be positioned on one surface of the polarizing plate that is relatively far from the backlight unit among the pair of polarizing plates.

In yet another example, the display device may include a display panel; and the polarizing plate positioned on at least one surface of the display panel.

The display device may be a liquid crystal display device including a liquid crystal panel and an optical laminate provided on both surfaces of the liquid crystal panel, wherein at least one of the polarizing plates may be a polarizing plate including a polarizer according to one embodiment of the present invention described above. In this case, the kind of the liquid crystal panel included in the liquid crystal display device is not particularly limited, but for example, a known panel such as a passive matrix-type panel such as a twisted nematic (TN), super twisted nematic (STN), ferroelectric (F) or polymer dispersed (PD) panel; an active matrix-type panel such as a two or three terminal panel, an in-plane switching (IPS) panel or a vertical alignment (VA) panel may be applied as the liquid crystal panel.

Advantageous Effects

According to the present invention, there can be provided a polarizing plate which can control a heat shrinkage rate of detail layers and the like, realize a stable internal structure while having a good bending balance and thus prevent cracks, and further, prevent a light leakage phenomenon in a liquid crystal display device, a liquid crystal panel and a display device including the above-mentioned polarizing plate.

BRIEF DESCRIPTION OF THE DRAWINGS

FIG. 1 shows an example of a polarizing plate of an embodiment of the present invention.

FIG. 2 shows another example of a polarizing plate of an embodiment of the present invention.

FIG. 3 shows yet another example of a polarizing plate of an embodiment of the present invention FIG. 4 shows an example of a liquid crystal panel of an embodiment of the present invention.

FIG. 5 shows another example of a liquid crystal panel of an embodiment of the present invention.

DETAILED DESCRIPTION OF THE EMBODIMENTS

Hereinafter, embodiments of the present invention are described in further detail with reference to examples. However, these examples are for illustrative purposes only and are not intended to limit the scope of the present invention.

Preparation Example

Preparation Example 1: Preparation of Optical Laminate (1) Preparation of Coating Liquid for Forming a Hard Coating Layer The components shown in Table 1 were mixed to prepare a coating liquid (B1, B2) for forming a hard coating layer of the optical laminate.

TABLE 1

| (unit: g) | B1 | B2 |
|---|---|---|
| TMPTA | — | 10.35 |
| PETA | 14.31 | 4.56 |
| UA-306T | 4.07 | 4.56 |
| SC2152 | 7.58 | 7.25 |
| IRG-184 | 1 | 1.26 |
| Tego wet 270 | 0.05 | 0.05 |
| BYK 350 | 0.05 | 0.05 |
| 2-butanol | 25.87 | 30.31 |
| IPA | 45.82 | 40.41 |
| XX-103BQ(2.0 μm, RI 1.515) | 0.35 | 0.38 |
| XX-113BQ(2.0 μm, RI 1.555) | 0.7 | 0.61 |
| MA-ST(30% in MeOH) | 0.2 | 0.21 |

TMPTA: trimethylolpropane triacrylate)
PETA: pentaerythritol triacrylate
UA-306T: urethane acrylate series, reaction product of toluene diisocyanate and pentaerythritol triacrylate (manufacture by Kyoeisha Chemical)
SC2152: Compound in which hexamethylene diisocyanurate (HMDI) and acrylate compound are connected by urethane bond [mass average molecular weight: 20,000/manufacturer: Miwon Specialty Chemical]
IRG-184: initiator (Irgacure 184, Ciba Specialty Chemicals)
Tego wet 270: leveling agent (Tego)
BYK 350: leveling agent (BYK-Chemie)
2-butanol: butyl alcohol
IPA: isopropyl alcohol
XX-103BQ (2.0 μm, Refractive Index 1.515): copolymerized particles of polystyrene and polymethylmethacrylate (manufactured by Sekisui Plastic)
XX-113BQ(2.0 μm, Refractive Index 1.555): copolymerized particles of polystyrene and polymethylmethacrylate (manufactured by Sekisui Plastic)
MA-ST (30% in MeOH): Dispersion in which silica nanoparticles with a size of 10 to 15 nm are dispersed in methyl alcohol (manufactured by Nissan Chemical)

(2) Preparation of Coating Liquid (C) for Forming Low-Refractive Index Layer 100 g of trimethylolpropane triacrylate (TMPTA), 283 g of hollow silica nanoparticles (diameter range: about 42 nm to 66 nm, JSC Catalyst and Chemicals), 59 g of solid silica nanoparticles (diameter range: about 12 nm to 19 nm), 115 g of a first fluorine-containing compound (X-71-1203M, Shin-Etsu), 15.5 g of a second fluorine-containing compound (RS-537, DIC Corporation) and 10 g of an initiator (Irgacure 127, Ciba) were diluted in a MIBK (methyl isobutyl ketone) solvent so as to have a solid content of 3 wt %, thereby preparing a coating liquid for forming a low-Refractive Index layer.

(3) Preparation of an Optical Laminate with a Hard Coat Layer Formed on a Light-Transmitting Substrate 1) Measurement of the Ratio of Heat Shrinkage Rate The ratio of a heat shrinkage rate in the MD direction: a heat shrinkage rate in the TD direction of the polyethylene terephthalate (PET) film used in each of Examples and Comparative Examples was calculated by cutting each PET film into a size of 10 cm*10 cm (width*length), allowing to stand at 80° C. for 30 minutes and then determining the heat shrinkage rate (deformed length/initial length) in each of the MD and TD directions.

PET 1: The ratio of heat shrinkage rate (MD:TD) is about 1

PET 2: The ratio of heat shrinkage rate (MD:TD) is about 0.5

2) Preparation of Optical Laminate

Each of the prepared coating liquids for forming a hard coating layer (B1, B2) was coated onto the respective polyethylene terephthalate (PET) films shown in Tables 2 and 3 below using a #12 Mayer bar, and then dried at the temperature shown in Tables 2 and 3 below for 2 minutes, and UV-cured to form a hard coating layer (coating thickness of 5 μm). The H bulb was used as a UV lamp and a curing reaction was performed under nitrogen atmosphere. The amount of UV light irradiated upon curing was 150 mJ/cm$^2$.

The coating liquid (C) for forming the low-refractive index layer was coated onto the hard coating film using a #4 Mayer bar so that the thickness was about 110 to 120 nm, and then dried and cured for 1 minute at the temperature shown in Tables 2 and 3 below. During the curing, the dried coating was irradiated with ultraviolet light of 252 mJ/cm$^2$ under a nitrogen purge.

3) Measurement of the Heat Shrinkage Deformation Value of the Optical Laminate

The optical laminate was cut into a size of 12 cm in the MD direction and the TD direction of the polyethylene terephthalate (PET) film, respectively, to prepare a sample for heat shrinkage deformation value measurement.

The prepared sample was allowed to stand at a temperature of 100° C. for 96 hours, and then the length of each of the MD direction and the TD direction was determined, thereby measuring the heat shrinkage deformation value in each direction.

Heat shrinkage deformation value in the first direction of the optical laminate (MD direction of PET)=The initial length of the first direction of the optical laminate (MD direction of PET)– The length of the first direction of the optical laminate (MD direction of PET) measured after exposure at a temperature of 100° C. for 96 hours  [General Formula 2-1]

Heat shrinkage deformation in the second direction of the optical laminate (TD direction of PET)=The initial length of the second direction of the optical laminate (TD direction of PET)– The length of the second direction of the optical laminate (TD direction of PET) measured after exposure at a temperature of 100° C. for 96 hours  [General Formula 3-1]

Then, in the optical laminate, the ratio (R) of a heat shrinkage deformation value in the second direction of the optical laminate (TD direction of PET) to a heat shrinkage deformation value in the first direction of the optical laminate (MD direction of PET) was determined.

> Ratio (R)=Heat shrinkage deformation value in the second direction of the optical laminate (TD direction of PET)/Heat shrinkage deformation value in the first direction of the optical laminate (MD direction of PET) [General Formula 1-1]

Preparation Example 2

Preparation of Coating Liquid for Forming Hard Coating Layer and Preparation of Polarizer with Hard Coating Layer Formed Thereon (1) Preparation of Coating Liquid (A) for Forming Hard Coating Layer 28 g of trimethylolpropane triacrylate, 2 g of KBE-403, 0.1 g of initiator KIP-100f, and 0.06 g of leveling agent (Tego wet 270) were uniformly mixed to prepare a hard coating composition.

Examples and Comparative Examples

Preparation of Polarizing Plate and Liquid Crystal Panel (1) Preparation of Polarizing Plate Polyvinyl alcohol polarizer (thickness: 25 um, manufacturer: LG Chem) was bonded onto the light-transmitting substrate of the optical laminate prepared in Preparation Example 1 using a UV adhesive, then the prepared coating liquid (A) for forming the hard coating layer was coated onto the opposite side of the light-transmitting substrate to a thickness of 7 um, and the dried coating was irradiated with ultraviolet light of 500 mJ/cm$^2$ under nitrogen purge to form a hard coating layer.

(2) Preparation of Sample for Thermal Shock Evaluation

The polarizing plate cut into a square where the length of one side was 10 cm was bonded to one surface of the glass for TV (12 cm wide, 12 cm long, and 0.7 mm thick) to prepare a sample for thermal shock evaluation. At this time, the polarizing plate was cut so that the MD direction of the polarizer was parallel to one side of the square.

Experimental Example

Thermal Shock Evaluation

The prepared polarizing plate and a sample for evaluation to which the polarizing plate was bonded, were subjected to a thermal shock test under the following conditions, and the following three items were measured and confirmed.

Measuring Conditions:

The polarizing plate and the sample for thermal shock evaluation were placed upright on a thermal shock chamber. The process in which the temperature was raised from room temperature to 80° C. and left for 30 minutes, after which the temperature was lowered to −30° C. and left for 30 minutes, and then the temperature was controlled to room temperature was defined as 1 cycle, and a total of 100 cycles were repeated.

(1) Number of Occurrence of Cracks

The cracks occurred between the polarizers of the sample for evaluation and the gaps formed between the polarizing plates were confirmed with the naked eye, and the number of occurrence of cracks with a length of 1 cm was confirmed.

(2) Bubble

The bubbles occurred between the polarizer and the protective film of the sample for evaluation and the bubbles occurred between the polarizer and the hard coating layer were confirmed with the naked eye and the number of bubbles having a diameter of 5 mm or more was confirmed.

(3) Vertex Detachment (mm), 10×10/Film

The four vertices of the polarizing plate sample were observed, and the detachment between the coating layer and the polarizer, the peeling between the polarizer and the protective film, and the peeling and bending between the hard coating and the cohesive layer were observed. When the detachment occurred and bending appeared, the bending height from the floor in a state where the sample placed flat on the floor was measured to calculate the average height.

TABLE 2

|  |  | Example 1 | Example 2 | Example 3 |
|---|---|---|---|---|
| Anti-reflection film | Low-refractive index layer | — | Coating liquid (C) | Coating liquid (C) |
|  | Drying temperature of low-refractive index layer | — | 40° C. | 40° C. |
|  | Hard coating layer | B1 | B1 | B2 |
|  | Thickness of hard coating layer | 3.8 μm | 4.0 μm | 5.2 μm |
|  | Drying temperature of hard coating | 60° C. | 60° C. | 60° C. |
|  | Substrate | PET 1 | PET 1 | PET 1 |
| Optical laminate | Heat shrinkage deformation value in MD direction of PET (1) | 0.73 mm | 0.63 mm | 0.67 mm |
|  | Heat shrinkage deformation value in TD direction of PET (2) | 0.7 mm | 0.58 mm | 0.58 mm |
|  | Ratio(R)(2/1) | 0.958904 | 0.920635 | 0.865672 |
| Result of thermal shock evaluation (10 × 10) | Number of occurrence of cracks | 0 | 0 | 0 |
|  | Bubble | 0 | 0 | 0 |
|  | Vertex detachment (mm), 10 × 10/film | 0 | 0 | 0 |

TABLE 3

| | | Comparative Example 1 | Comparative Example 2 | Comparative Example 3 | Comparative Example 4 |
|---|---|---|---|---|---|
| Anti-reflection film | Low-refractive index layer | — | Coating liquid (C) | Coating liquid (C) | — |
| | Drying temperature of low-refractive index layer | — | 40° C. | 40° C. | — |
| | Hard coating layer | B1 | B1 | B2 | B2 |
| | Thickness of hard coating layer | 4.0 μm | 4.3 μm | 5.3 μm | 5.0 μm |
| | Drying temperature of hard coating | 60° C. | 60° C. | 60° C. | 60° C. |
| | Substrate | PET 2 | PET 2 | PET 2 | PET 2 |
| Optical laminate | Heat shrinkage deformation value in MD direction of PET (1) | 0.21 mm | 0.21 mm | 0.42 mm | 0.41 mm |
| | Heat shrinkage deformation value in TD direction of PET (2) | 0.5 mm | 0.53 mm | 0.67 mm | 0.58 mm |
| | Ratio (R)(2/1) | 2.380952 | 2.52381 | 1.595238 | 1.414634 |
| Result of thermal shock evaluation (10 × 10) | Number of occurrence of cracks | 0 | 1 | 2 | 2 |
| | Bubble | 1 | 1 | 2 | 2 |
| | Vertex detachment (mm), 10 × 10/film | 4 | 3 | 4 | 4 |

As shown in Table 2 and Table 3 above, it was confirmed that in the polarizing plate of Examples, even when a temperature of 60° C. or higher is applied in the production process, the heat shrinkage rate and the heat shrinkage deformation value between detail layers is controlled, in particular, the ratio of a heat shrinkage deformation value in the second direction of the optical laminate perpendicular to the first direction to a heat shrinkage deformation value in the first direction of the optical laminate is within 0.8 to 1.2. Consequently, it was confirmed that the polarizing plates of Examples have excellent bending balance, and prevent the occurrent of cracks in the polarizing plate, and further can prevent a light leakage phenomenon of the liquid crystal display device.

EXPLANATION OF SIGN

10: light-transmitting substrate
20: polarizer
30: hard coating layer
40: anti-reflection layer
50: adhesive layer
60: cohesive layer
70 liquid crystal cell
100 polarizing plate
200 liquid crystal panel

What is claimed is:

1. A polarizing plate comprising:
   a polarizer;
   a hard coating layer having a thickness of 10 μm or less formed on one surface side of the polarizer; and
   an optical laminate including a light-transmitting substrate formed on the other surface side of the polarizer,
   wherein the hard coating layer contacts the polarizer, and
   wherein a ratio of a second heat shrinkage deformation value in a second direction of the optical laminate to a first heat shrinkage deformation value in a first direction of the optical laminate is 0.8 to 1.2 and wherein the first direction is perpendicular to the second direction, and
   wherein each of the first heat shrinkage deformation value and the second heat shrinkage deformation value is a difference between an initial length of each of the first direction and the second direction of the optical laminate and a length value as measured after exposure of the optical laminate to a condition of a temperature of 100° C. to 120° C. for 80 to 120 hours.

2. The polarizing plate of claim 1, wherein
   the first direction of the optical laminate is a machine direction of the light-transmitting substrate, and
   the second direction of the optical laminate is a transverse direction of the light-transmitting substrate.

3. The polarizing plate of claim 1, wherein
   the light-transmitting substrate has a thickness direction retardation (Rth) of 3,000 nm or more as measured at a wavelength of 400 nm to 800 nm.

4. The polarizing plate of claim 1, wherein
   the light-transmitting substrate has a moisture permeation amount of 100 g/m$^2$ or less as measured for 24 hours under a condition of 40° C. and 100% humidity.

5. The polarizing plate of claim 1, wherein
   a ratio of the thickness of the hard coating layer to the thickness of the light-transmitting substrate is 0.02 to 0.25.

6. The polarizing plate of claim 1, wherein
   the thickness of the polarizer plus the hard coating layer plus the light-transmitting substrate is 200 μm or less.

7. The polarizing plate of claim 1, wherein
   the hard coating layer includes a binder resin and organic or inorganic fine particles dispersed in the binder resin, the organic fine particles having a particle size of 0.5 μm to 10 μm, and the inorganic fine particles having a particle size of 1 nm to 500 nm.

8. The polarizing plate of claim 1,
   further comprising a second hard coating layer having a thickness of 1 to 100 μm formed on one surface of the light-transmitting substrate opposite side against the polarizer.

9. The polarizing plate of claim 8,
further comprising a low-refractive index layer having a refractive index of 1.20 to 1.60 in the wavelength range of 380 nm to 780 nm formed on the other surface of the second hard coating layer.

10. The polarizing plate of claim 1,
further comprising an adhesive layer disposed between the polarizer and the light-transmitting substrate and having a thickness of 0.1 μm to 5 μm.

11. A liquid crystal panel comprising a liquid crystal cell and the polarizing plate of claim 1 formed on at least one surface of the liquid crystal cell.

12. The liquid crystal panel of claim 11, wherein
the liquid crystal panel comprises two polarizing plates such that each of the two polarizing plates is formed on each of two surfaces of the liquid crystal cell, and
the two polarizing plates are positioned such that a MD direction of the polarizer of the polarizing plate formed on one surface side of the liquid crystal cell and a MD direction of the polarizer of the polarizing plate formed on the other surface are perpendicular to each other.

13. A display device comprising the polarizing plate of claim 1.

14. The polarizing plate of claim 1, wherein
the first direction of the optical laminate is a machine direction of the light-transmitting substrate, and
the second direction of the optical laminate is a transverse direction of the light-transmitting substrate.

* * * * *